United States Patent
Araki et al.

[11] Patent Number: 6,128,180
[45] Date of Patent: Oct. 3, 2000

[54] SOLID ELECTROLYTIC CAPACITOR USING A CONDUCTIVE POLYMER FILM

[75] Inventors: Kenji Araki; Takashi Fukaumi; Yuji Aoki; Kenichi Takahashi, all of Toyama, Japan

[73] Assignee: NEC Corporation, Tokyo, Japan

[21] Appl. No.: 09/205,194

[22] Filed: Dec. 4, 1998

[30] Foreign Application Priority Data

Dec. 4, 1997 [JP] Japan ................................. 9-334197

[51] Int. Cl.[7] .......................... H01G 9/025; H01G 9/15
[52] U.S. Cl. .................. 361/525; 361/524; 361/528; 361/537; 361/540
[58] Field of Search .................. 361/523–529, 361/532–540, 501

[56] References Cited

U.S. PATENT DOCUMENTS

| | | | |
|---|---|---|---|
| 5,036,434 | 7/1991 | Kobayashi | 361/540 |
| 5,142,452 | 8/1992 | Saiki | 361/540 |
| 5,254,137 | 10/1993 | Mitani | 29/25.03 |
| 5,471,365 | 11/1995 | Nakamura et al. | 361/523 |
| 5,473,503 | 12/1995 | Sakata et al. | 361/525 |
| 5,586,000 | 12/1996 | Sakata et al. | 361/525 |
| 5,654,869 | 8/1997 | Ohi et al. | 361/540 |

*Primary Examiner*—Kristine Kincaid
*Assistant Examiner*—Eric Thomas
*Attorney, Agent, or Firm*—Young & Thompson

[57] ABSTRACT

An electrically conductive polymer layer of a solid electrolytic capacitor that coats a dielectric layer that coats an anode. An anode lead projects outwardly from the anode through the dielectric layer, and the electrically conductive polymer layer is separated by the dielectric layer form the anode lead. The electrically conductive polymer layer has a thicker portion than a remaining portion thereof and the thicker portion extends at least in the vicinity of the anode lead, and the thicker portion is bounded with the remaining portion so that a sloped-boundary loop between the thicker portion and the remaining portion extends to be parallel to a flat plane perpendicular to a direction along which the anode lead projects through the dielectric layer, whereby the thicker portion continuously extends close to the anode lead than the remaining portion.

15 Claims, 2 Drawing Sheets

SOLID ELECTROLYTIC CAPACITOR USING A CONDUCTIVE POLYMER FILM

BACKGROUND OF THE INVENTION

The present invention relates to a capacitor, and more particularly to a solid electrolytic capacitor using an electrically conductive polymer and a method of forming the same.

The solid electrolytic capacitor has an anode, a dielectric film on surfaces of the anode, and a cathode on an outer surface of the dielectric film, so that the cathode is electrically separated by the dielectric film from the anode. The dielectric film may comprise an oxide film. The anode may comprise a porous form of a valve action metal such as tantalum, niobium or aluminum. The cathode may have a part made of a solid electrolyte which is in contact with an entire surface of the dielectric film. The solid electrolyte serves as an electrical connection between an electrode lead and the entire surface of the dielectric film. In view of a possible reduction in resistance of the capacitor, it is, of course, preferable that the solid electrolyte has a possible high electrical conductivity. It is further required that the solid electrolyte is capable of suppressing short circuit current due to defects of the dielectric film. The solid electrolyte is capable of exhibiting a transition into an insulator upon a heat generation due to the short circuit current. Therefore, the solid electrolyte is required to have both the possible high electrical conductivity and the transition capability into the insulator upon a heat generation due to the short circuit current, for which reason manganese dioxide or TCNQ complex have been used as the solid electrolyte. Particularly when the solid electrolytic capacitor is mounted on a printed circuit board, the solid electrolytic capacitor is then subjected to a heat at 240–260° C. In this case, manganese dioxide has been used because manganese dioxide is thermally stable at a high temperature of at least 240° C.

Consequently, the solid electrolyte for the solid electrolytic capacitor to be mounted on the printed circuit board is required to have the high electrical conductivity, the transition capability into the insulator upon the heat generation due to the short circuit current, and the thermal stability at the high temperature of at least 240° C.

Manganese dioxide have the required transition capability and thermal stability but insufficient electrical conductivity of about 0.1 S/cm. Advanced solid electrolytic capacitors are required to have much higher electrical conductivity of 10–100 S/cm.

In the above recent circumstances, available solid electrolyte satisfying the above three requirements of transition capability, high thermal stability and high electrical conductivity is specified electrically conductive polymers, for example, polypyrrole, polythiophene, and polyaniline. Developments of such solid electrolytic capacitor using electrically conductive polymers as the solid electrolyte have been active. The solid electrolytic capacitor using polypyrrole as the solid electrolyte has already been commercialized.

In Japanese laid-open patent publication No. 2-15611, it is disclosed that thiophene derivatives are polymerized with ferric compound to form polythiophene to be used as the solid electrolyte for the solid electrolytic capacitor. This polymer of thiophene derivatives is superior than a polymer of pyrrole derivatives in smaller drop of electrical conductivity in a high temperature atmosphere.

In Japanese laid-open patent publication No. 5-152169, it is disclosed that immediately after the dielectric film coating the anode has been dipped into an oxidizing agent solution with a solvent almost entirely consisting of water, then another solution including pyrrole monomers or thiophene monomers for causing polymerization reaction thereof so as to form a polypyrrole film, or a polythiophene film as the solid electrolyte. These polymers of pyrrole and thiophene are also superior in smaller drop of electrical conductivity in a high temperature atmosphere.

The above electrically conductive polymer film as the solid electrolyte coats the dielectric film which further coats the valve action metal anode. The above conventional method of forming the electrically conductive polymer film as the solid electrolyte on the dielectric film results in a formation of a thin electrically conductive polymer film that is incapable of withstanding mechanical stresses applied by expansion and shrinkage of an armored resin material which coats the electrically conductive polymer film. Particularly in the vicinity of a projecting anode lead, the electrically conductive polymer film is mechanically weak, for which reason the electrically conductive polymer film is required to have an increased strength against the mechanical stresses applied by expansion and shrinkage of the armored resin material.

Even if the number of polymerization is increased to increase the thickness of the electrically conductive polymer film as the solid electrolyte for improvement in capability of withstanding mechanical stresses applied by expansion and shrinkage of the armored resin material, antinomy problem is raised with increase in equivalent series resistance of the solid electrolytic capacitor, because the increase in thickness of the film laminated over the entire surface of the valve action metal anode results in increase in the equivalent series resistance of the solid electrolytic capacitor. Notwithstanding, it is extremely important for the advanced solid electrolytic capacitor to realize a possible reduction in the equivalent series resistance.

Consequently, the above conventional method of forming the electrically conductive polymer film as the solid electrolyte is engaged with the problem in antinomy to the effect that the increase in thickness of the electrically conductive polymer film for the purpose of improvement in capability of withstanding mechanical stresses applied by expansion and shrinkage of the armored resin material would result in increase in the equivalent series resistance, whilst the decrease in thickness of the electrically conductive polymer film for the purpose of reducing the equivalent series resistance would result in decrease in capability of withstanding mechanical stresses applied by expansion and shrinkage of the armored resin material.

In the above circumstances, it had been required to develop a novel solid electrolytic capacitor free from the above problems and a method of forming the same.

SUMMARY OF THE INVENTION

Accordingly, it is an object of the present invention to provide a novel solid electrolytic capacitor free from the above problems.

It is a further object of the present invention to provide a novel solid electrolytic capacitor having a possible high electrical conductivity.

It is a still further object of the present invention to provide a novel solid electrolytic capacitor having a capability of exhibiting a transition into an insulator upon a heat generation by a short circuit current due to defects of a dielectric film for suppressing the short circuit current.

It is yet a further object of the present invention to provide a novel solid electrolytic capacitor having a possible high thermal stability at a temperature of at least 240° C.

It is a further more object of the present invention to provide a novel solid electrolytic capacitor, wherein the electrically conductive polymer film has a sufficient thickness for withstanding mechanical stresses applied by expansion and shrinkage of an armored resin material, particularly in the vicinity of a projecting anode lead.

It is still more object of the present invention to provide a novel solid electrolytic capacitor having a reduced equivalent series resistance.

It is moreover object of the present invention to provide a novel method of forming an electrically conductive polymer film as a solid electrolyte for a solid electrolytic capacitor free from the above problems.

It is another object of the present invention to provide a novel method of forming an electrically conductive polymer film as a solid electrolyte for a solid electrolytic capacitor having a possible high electrical conductivity.

It is still another object of the present invention to provide a novel method of forming an electrically conductive polymer film as a solid electrolyte for a solid electrolytic capacitor having a capability of exhibiting a transition into an insulator upon a heat generation by a short circuit current due to defects of a dielectric film for suppressing the short circuit current.

It is yet another object of the present invention to provide a novel method of forming an electrically conductive polymer film as a solid electrolyte for a solid electrolytic capacitor having a possible high thermal stability at a temperature of at least 240° C.

It is further another object of the present invention to provide a novel method of forming an electrically conductive polymer film as a solid electrolyte for a solid electrolytic capacitor, wherein the electrically conductive polymer film has a sufficient thickness for withstanding mechanical stresses applied by expansion and shrinkage of an armored resin material, particularly in the vicinity of a projecting anode lead.

It is an additional object of the present invention to provide a novel method of forming an electrically conductive polymer film as a solid electrolyte for a solid electrolytic capacitor having a reduced equivalent series resistance.

The present invention provides an electrically conductive polymer layer of a solid electrolytic capacitor, the electrically conductive polymer layer coating a dielectric layer coating an anode with an anode lead which projects outwardly from the anode through the dielectric layer, and the electrically conductive polymer layer being separated by the dielectric layer from the anode lead, wherein the electrically conductive polymer layer has a thicker portion than a remaining portion thereof and the thicker portion extends at least in the vicinity of the anode lead, and the thicker portion is bounded with the remaining portion so that a sloped-boundary loop between the thicker portion and the remaining portion extends to be parallel to a flat plane vertical to a direction along which the anode lead projects through the dielectric layer, whereby the thicker portion continuously extends closer to the anode lead than the remaining portion.

The another present invention also provides a method of forming an electrically conductive polymer layer on a surface of a dielectric layer coating an anode with an anode lead projecting from the anode through the dielectric layer. The method comprises the steps of: dipping the anode coated with the dielectric layer into a first solution including an oxidizing agent and having a first specific gravity; and subsequently dipping the anode coated with the dielectric layer which still remains wetted with a thin film of the first solution into a second solution including monomers of an electrically conductive polymer and being insoluble with the first solution and further having a second specific gravity larger than the first specific gravity in such a direction that an anode-lead formation position is positioned upwardly, so that the thin film of the first solution is partially floated to move upwardly so as to thickly coat an upper portion of the dielectric layer, whereby a polymerization reaction of the monomers is predominantly caused on the upper portion of the dielectric layer, thereby to form an electrically conductive polymer layer having a thicker portion than a remaining portion thereof, wherein the thicker portion extends on the upper portion of the dielectric layer. The boundary between the thicker portion and the remaining portion is not step-shaped but is slope-shaped. The boundary forms a sloped-boundary loop which extends to be parallel to a flat plane vertical to a direction that an anode-lead formation position is positioned upwardly, whereby the thicker portion continuously extends in a closer to the anode-lead formation position than the remaining portion.

The still another present invention also provides a method of forming an electrically conductive polymer layer on a surface of a dielectric layer coating an anode with an anode lead projecting from the anode through the dielectric layer. The method comprises the steps of: dipping the anode coated with the dielectric layer into a first solution including an oxidizing agent and having a first specific gravity; drying a surface of the dielectric layer coating the anode to form a dried thin film of the oxidizing agent which coats the surface of the dielectric layer; dipping the anode coated with the dielectric layer coated with the dried thin film of the oxidizing agent into a pure water to form a wet thin film containing the oxidizing agent; and subsequently dipping the anode coated with the dielectric layer coated with the wet thin film into a second solution including monomers of an electrically conductive polymer and being insoluble with the first solution and further having a second specific gravity larger than the first specific gravity in such a direction that the anode-lead formation position is positioned upwardly, so that the wet thin film is partially floated to move upwardly so as to thickly coat an upper portion of the dielectric layer, whereby a polymerization reaction of the monomers is predominantly caused on the upper portion of the dielectric layer, thereby to form an electrically conductive polymer layer having a thicker portion than a remaining portion thereof, wherein the thicker portion extends on the upper portion of the dielectric layer. The boundary between the thicker portion and the remaining portion is not step-shaped but is slope-shaped. The boundary forms a sloped-boundary loop which extends to be parallel to a flat plane vertical to a direction that the anode-lead formation position is positioned upwardly, whereby the thicker portion continuously extends in a closer to the anode-lead formation position than the remaining portion.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
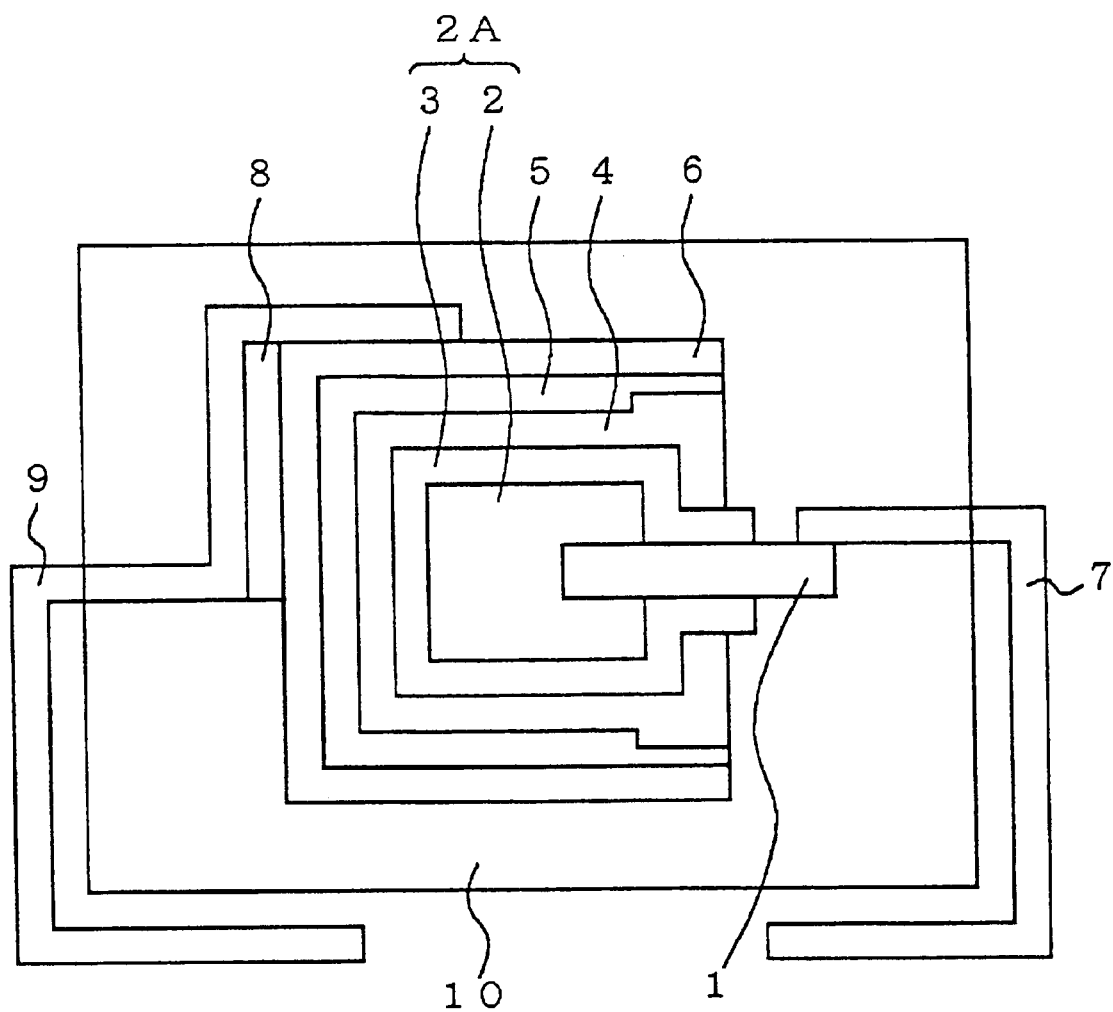
FIG. 1 is a cross sectional elevation view illustrative of a novel solid electrolytic capacitor having an improved conductive polymer layer in accordance with the present invention.

The first aspect of the present invention provides an electrically conductive polymer layer of a solid electrolytic capacitor, the electrically conductive polymer layer coating a dielectric layer coating an anode with an anode lead which projects outwardly from the anode through the dielectric layer, and the electrically conductive polymer layer being separated by the dielectric layer from the anode lead, wherein the electrically conductive polymer layer has a thicker portion than a remaining portion thereof and the thicker portion extends at least in the vicinity of the anode lead, and the thicker portion is bounded with the remaining portion so that a sloped-boundary loop between the thicker portion and the remaining portion extends to be parallel to a flat plane vertical to a direction along which the anode lead projects through the dielectric layer, whereby the thicker portion continuously extends closer to the anode lead than the remaining portion, and wherein the thicker portion has a first thickness which is thicker by 1–40 micrometers than a second thickness of the remaining portion and the second thickness is 0.05–10 micrometers.

It is preferable that the thicker portion extends in a range of one quarter to one third of an existent region of inside faces of the electrically conductive polymer layer in the direction along which the anode lead projects through the dielectric layer.

It is also preferable that the first thickness is thicker by 1–20 micrometers than the second thickness.

The electrically conductive polymer layer has a high electrical conductivity, a capability of exhibiting a transition into an insulator upon a heat generation by a short circuit current due to defects of a dielectric film for suppressing the short circuit current, and a high thermal stability at a temperature of, for example, at least 240° C. The electrically conductive polymer layer is doped with an electron donor or an electron acceptor to have a high conductivity of not less than about 1 S/m. The conductivity may be controlled by selecting substances of the oxidizing agent and monomers and controlling polymerization reaction conditions.

The thicker portion of the electrically conductive polymer film has a sufficiently large thickness for withstanding mechanical stresses applied by expansion and shrinkage of an armored resin material, particularly in the vicinity of the projecting anode lead, whilst the remaining portion of the electrically conductive polymer layer has a sufficiently thin thickness for reducing an equivalent series resistance.

The second aspect of the present invention provides a solid electrolytic capacitor comprising: an anode made of a valve action metal; a dielectric layer coating the anode; an anode lead projecting from the anode through the dielectric layer; a cathode having an electrically conductive polymer layer which coats the dielectric layer; and a cathode lead projecting from the cathode, whereby the cathode is electrically separated by the dielectric layer from both the anode and the anode lead, wherein the electrically conductive polymer layer has a thicker portion than a remaining portion thereof and the thicker portion extends at least in the vicinity of the anode lead, and the thicker portion is bounded with the remaining portion so that a sloped-boundary loop between the thicker portion and the remaining portion extends to be parallel to a flat plane vertical to a direction along which the anode lead projects through the dielectric layer, whereby the thicker portion continuously extends closer to the anode lead than the remaining portion, and wherein the thicker portion has a first thickness which is thicker by 1–40 micrometers than a second thickness of the remaining portion and the second thickness is 0.05–10 micrometers.

It is preferable that the thicker portion extends in a range of one quarter to one third of an existent region of inside faces of the electrically conductive polymer layer in the direction along which the anode lead projects through the dielectric layer.

It is also preferable that the first thickness is thicker by 1–20 micrometers than the second thickness.

The electrically conductive polymer layer has a high electrical conductivity, a capability of exhibiting a transition into an insulator upon a heat generation by a short circuit current due to defects of a dielectric film for suppressing the short circuit current, and a high thermal stability at a temperature of, for example, at least 240° C. The electrically conductive polymer layer is doped with an electron donor or an electron acceptor to have a high conductivity of not less than about 1 S/m. The conductivity may be controlled by selecting substances of the oxidizing agent and monomers and controlling polymerization reaction conditions.

The thicker portion of the electrically conductive polymer film has a sufficiently large thickness for withstanding mechanical stresses applied by expansion and shrinkage of an armored resin material, particularly in the vicinity of the projecting anode lead, whilst the remaining portion of the electrically conductive polymer layer has a sufficiently thin thickness for reducing an equivalent series resistance.

The third aspect of the present invention provides a solid electrolytic capacitor comprising: an anode made of a valve action metal; a dielectric layer coating the anode; an anode lead projecting from the anode through the dielectric layer; a cathode having an electrically conductive polymer layer which coats the dielectric layer, whereby the cathode is electrically separated by the dielectric layer from both the anode and the anode lead; and a cathode lead projecting from the cathode, wherein the electrically conductive polymer layer has a thicker portion than a remaining portion thereof and the thicker portion extends at least in the vicinity of the anode lead, and the thicker portion is bounded with the remaining portion so that a sloped-boundary loop between the thicker portion and the remaining portion extends to be parallel to a flat plane vertical to a direction along which the anode lead projects through the dielectric layer, whereby the thicker portion continuously extends closer to the anode lead than the remaining portion.

It is preferable that the thicker portion extends in a range of one quarter to one third of an existent region of inside faces of the electrically conductive polymer layer in the direction along which the anode lead projects through the dielectric layer.

It is also preferable that the thicker portion has a first thickness which is thicker by 1–40 micrometers than a second thickness of the remaining portion and the second thickness is 0.05–10 micrometers.

It is also preferable that the first thickness is thicker by 1–20 micrometers than the second thickness.

The electrically conductive polymer layer has a high electrical conductivity, a capability of exhibiting a transition into an insulator upon a heat generation by a short circuit current due to defects of a dielectric film for suppressing the short circuit current, and a high thermal stability at a temperature of, for example, at least 240° C. The electrically conductive polymer layer is doped with an electron donor or an electron acceptor to have a high conductivity of not less than about 1 S/m. The conductivity may be controlled by selecting substances of the oxidizing agent and monomers and controlling polymerization reaction conditions.

The thicker portion of the electrically conductive polymer film has a sufficiently large thickness for withstanding mechanical stresses applied by expansion and shrinkage of an armored resin material, particularly in the vicinity of the projecting anode lead, whilst the remaining portion of the electrically conductive polymer layer has a sufficiently thin thickness for reducing an equivalent series resistance.

The fourth aspect of the present invention provides an electrically conductive polymer layer of a solid electrolytic capacitor. The electrically conductive polymer layer coats a dielectric layer coating an anode with an anode lead which projects outwardly from the anode through the dielectric layer. The electrically conductive polymer layer is separated by the dielectric layer from the anode and the anode lead, wherein the electrically conductive polymer layer has a thicker portion than a remaining portion thereof and the thicker portion extends at least in the vicinity of the anode lead.

It is preferable that the thicker portion is bounded with the remaining portion so that a sloped-boundary loop between the thicker portion and the remaining portion extends to be parallel to a flat plane, whereby the thicker portion continuously extends closer to the anode lead than the remaining portion.

It is also preferable that the flat plane including the sloped boundary loop between the thicker portion and the remaining portion is vertical to a direction along which the anode lead projects through the dielectric layer.

It is also preferable that the thicker portion extends in a range of one quarter to one third of an existent region of inside faces of the electrically conductive polymer layer in the direction along which the anode lead projects through the dielectric layer.

It is also preferable that the thicker portion has a first thickness which is thicker by 1–40 micrometers than a second thickness of the remaining portion and the second thickness is 0.05–10 micrometers.

It is also preferable that the first thickness is thicker by 1–20 micrometers than the second thickness.

The electrically conductive polymer layer has a high electrical conductivity, a capability of exhibiting a transition into an insulator upon a heat generation by a short circuit current due to defects of a dielectric film for suppressing the short circuit current, and a high thermal stability at a temperature of, for example, at least 240° C. The electrically conductive polymer layer is doped with an electron donor or an electron acceptor to have a high conductivity of not less than about 1 S/m. The conductivity may be controlled by selecting substances of the oxidizing agent and monomers and controlling polymerization reaction conditions.

The thicker portion of the electrically conductive polymer film has a sufficiently large thickness for withstanding mechanical stresses applied by expansion and shrinkage of an armored resin material, particularly in the vicinity of the projecting anode lead, whilst the remaining portion of the electrically conductive polymer layer has a sufficiently thin thickness for reducing an equivalent series resistance.

The fifth aspect of the present invention provides a method of forming an electrically conductive polymer layer on a surface of a dielectric layer coating an anode with an anode lead projecting from the anode through the dielectric layer. The method comprises the steps of: dipping the anode coated with the dielectric layer into a first solution including an oxidizing agent and having a first specific gravity; and subsequently dipping the anode coated with the dielectric layer which still remains wetted with a thin film of the first solution into a second solution including monomers of an electrically conductive polymer and being insoluble with the first solution and further having a second specific gravity larger than the first specific gravity in such a direction that an anode-lead formation position is positioned upwardly, so that the thin film of the first solution is partially floated to move upwardly so as to thickly coat an upper portion of the dielectric layer, whereby a polymerization reaction of the monomers is predominantly caused on the upper portion of the dielectric layer, thereby to form an electrically conductive polymer layer having a thicker portion than a remaining portion thereof, wherein the thicker portion extends on the upper portion of the dielectric layer. The boundary between the thicker portion and the remaining portion is not step-shaped but is slope-shaped. The boundary forms a sloped-boundary loop which extends to be parallel to a flat plane vertical to a direction that an anode-lead formation position is positioned upwardly, whereby the thicker portion continuously extends closer to the anode-lead formation position than the remaining portion.

It is preferable that the second specific gravity is larger than the first specific gravity by not less than 0.1 and wherein the second solution has a solubility of not more than 0.3 g of the monomers to 1000 cc of water.

It is also preferable that the first solution comprises a ferric toluenesulfonate solution and the second solution comprises a 3,4-ethylene-dioxythiophene solution.

It is also preferable that the first solution comprises a ferric benzenesulfonate solution and the second solution comprises a 3,4-ethylene-dioxythiophene solution.

The electrically conductive polymer layer has a high electrical conductivity, a capability of exhibiting a transition into an insulator upon a heat generation by a short circuit current due to defects of a dielectric film for suppressing the short circuit current, and a high thermal stability at a temperature of, for example, at least 240° C. The electrically conductive polymer layer is doped with an electron donor or an electron acceptor to have a high conductivity of not less than about 1 S/m. The conductivity may be controlled by selecting substances of the oxidizing agent and monomers and controlling polymerization reaction conditions.

The thicker portion of the electrically conductive polymer film has a sufficiently large thickness for withstanding mechanical stresses applied by expansion and shrinkage of an armored resin material, particularly in the vicinity of the anode-lead formation position, whilst the remaining portion of the electrically conductive polymer layer has a sufficiently thin thickness for reducing an equivalent series resistance.

The sixth aspect of the present invention provides a method of forming an electrically conductive polymer layer on a surface of a dielectric layer coating an anode with an anode lead projecting from the anode through the dielectric layer . The method comprises the steps of: dipping the anode coated with the dielectric layer into a first solution including an oxidizing agent and having a first specific gravity; drying a surface of the dielectric layer coating the anode to form a dried thin film of the oxidizing agent which coats the surface of the dielectric layer; dipping the anode coated with the dielectric layer coated with the dried thin film of the oxidizing agent into a pure water to form a wet thin film containing the oxidizing agent; and subsequently dipping the anode coated with the dielectric layer coated with the wet thin film into a second solution including monomers of an electrically conductive polymer and being insoluble with the first solution and further having a second specific gravity larger than the first specific gravity in such a direction that the anode-lead formation position is positioned upwardly, so that the wet thin film is partially floated to move upwardly so as to thickly coat an upper portion of the dielectric layer, whereby a polymerization reaction of the monomers is predominantly caused on the upper portion of the dielectric layer, thereby to form an electrically conductive polymer layer having a thicker portion than a remaining portion thereof, wherein the thicker portion extends on the upper portion of the dielectric layer. The boundary between the thicker portion and the remaining portion is not step-shaped but is slope-shaped.

The boundary forms a sloped-boundary loop which extends to be parallel to a flat plane vertical to a direction that the anode-lead formation position is positioned upwardly, whereby the thicker portion continuously extends closer to the anode-lead formation position than the remaining portion.

It is preferable that the second specific gravity is larger than the first specific gravity by not less than 0.1 and wherein the second solution has a solubility of not more than 0.3 g of the monomers to 1000 cc of water.

It is also preferable that the first solution comprises a ferric toluenesulfonate solution and the second solution comprises a 3,4-ethylene-dioxythiophene solution.

It is also preferable that the first solution comprises a ferric benzenesulfonate solution and the second solution comprises a 3,4-ethylene-dioxythiophene solution.

The electrically conductive polymer layer has a high electrical conductivity, a capability of exhibiting a transition into an insulator upon a heat generation by a short circuit current due to defects of a dielectric film for suppressing the short circuit current, and a high thermal stability at a temperature of, for example, at least 240° C. The electrically conductive polymer layer is doped with an electron donor or an electron acceptor to have a high conductivity of not less than about 1 S/m. The conductivity may be controlled by selecting substances of the oxidizing agent and monomers and controlling polymerization reaction conditions.

The thicker portion of the electrically conductive polymer film has a sufficiently large thickness for withstanding mechanical stresses applied by expansion and shrinkage of an armored resin material, particularly in the vicinity of the anode-lead formation position, whilst the remaining portion of the electrically conductive polymer layer has a sufficiently thin thickness for reducing an equivalent series resistance.

The seventh aspect of the present invention provides a method of forming an electrically conductive polymer layer on a surface of a dielectric layer coating an anode with an anode lead projecting from the anode through the dielectric layer. The method comprises the steps of: supplying a surface of the dielectric layer coating the anode with a first solution including an oxidizing agent and having a first specific gravity; and subsequently placing the anode coated with the dielectric layer which still remains wetted with a thin film of the first solution into a second solution including monomers of an electrically conductive polymer and being insoluble with the first solution and further having a second specific gravity larger than the first specific gravity in such a direction that the anode-lead formation position is positioned upwardly, so that the thin film of the first solution is partially floated to move upwardly so as to thickly coat an upper portion of the dielectric layer, whereby a polymerization reaction of the monomers is predominantly caused on the upper portion of the dielectric layer, thereby to form an electrically conductive polymer layer having a thicker portion than a remaining portion thereof, wherein the thicker portion extends on the upper portion of the dielectric layer. The boundary between the thicker portion and the remaining portion is not step-shaped but is slope-shaped. The boundary forms a sloped-boundary loop which extends to be parallel to a flat plane vertical to a direction that the anode-lead formation position is positioned upwardly, whereby the thicker portion continuously extends closer to the anode-lead formation position is positioned upwardly than the remaining portion.

It is preferable that the second specific gravity is larger than the first specific gravity by not less than 0.1 and that the second solution has a solubility of not more than 0.3 g of the monomers to 1000 cc of water.

It is also preferable that the first solution comprises a ferric toluenesulfonate solution and the second solution comprises a 3,4-ethylene-dioxythiophene solution.

It is also preferable that the first solution comprises a ferric benzenesulfonate solution and the second solution comprises a 3,4-ethylene-dioxythiophene solution.

The electrically conductive polymer layer has a high electrical conductivity, a capability of exhibiting a transition into an insulator upon a heat generation by a short circuit current due to defects of a dielectric film for suppressing the short circuit current, and a high thermal stability at a temperature of, for example, at least 240° C. The electrically conductive polymer layer is doped with an electron donor or an electron acceptor to have a high conductivity of not less than about 1 S/m. The conductivity may be controlled by selecting substances of the oxidizing agent and monomers and controlling polymerization reaction conditions.

The thicker portion of the electrically conductive polymer film has a sufficiently large thickness for withstanding mechanical stresses applied by expansion and shrinkage of an armored resin material, particularly in the vicinity of the anode-lead formation position is positioned upwardly, whilst the remaining portion of the electrically conductive polymer layer has a sufficiently thin thickness for reducing an equivalent series resistance.

The eighth aspect of the present invention provides a method of forming an electrically conductive polymer layer on a surface of a dielectric layer coating an anode with an anode lead projecting from the anode through the dielectric layer. The method comprises the steps of: supplying a surface of the dielectric layer with a first solution including an oxidizing agent and having a first specific gravity; drying a surface of the dielectric layer to form a dried thin film of the oxidizing agent which coats the surface of the dielectric layer; supplying the dried thin film with a pure water to form a wet thin film containing the oxidizing agent; and subsequently placing the anode coated with the dielectric layer coated with the wet thin film into a second solution including monomers of an electrically conductive polymer and being insoluble with the first solution and further having a second specific gravity larger than the first specific gravity in such a direction that the anode-lead formation position is positioned upwardly, so that the wet thin film is partially floated to move upwardly so as to thickly coat an upper portion of the dielectric layer, whereby a polymerization reaction of the monomers is predominantly caused on the upper portion of the dielectric layer, thereby to form an electrically conductive polymer layer having a thicker portion than a remaining portion thereof, wherein the thicker portion extends on the upper portion of the dielectric layer. The boundary between the thicker portion and the remaining portion is not step-shaped but is slope-shaped. The boundary forms a sloped-boundary loop which extends to be parallel to a flat plane vertical to a direction that an anode-lead formation position is positioned upwardly, whereby the thicker portion continuously extends closer to the anode-lead formation position than the remaining portion.

It is preferable that the second specific gravity is larger than the first specific gravity by not less than 0.1 and that the second solution has a solubility of not more than 0.3 g of the monomers to 1000 cc of water.

It is preferable that the first solution comprises a ferric toluenesulfonate solution and the second solution comprises a 3,4-ethylene-dioxythiophene solution.

It is preferable that the first solution comprises a ferric benzene-sulfonate solution and the second solution comprises a 3,4-ethylene-dioxythiophene solution.

The electrically conductive polymer layer has a high electrical conductivity, a capability of exhibiting a transition into an insulator upon a heat generation by a short circuit current due to defects of a dielectric film for suppressing the short circuit current, and a high thermal stability at a temperature of for example, at least 240° C. The electrically conductive polymer layer is doped with an electron donor or an electron acceptor to have a high conductivity of not less than about 1 S/m. The conductivity may be controlled by selecting substances of the oxidizing agent and monomers and controlling polymerization reaction conditions.

The thicker portion of the electrically conductive polymer film has a sufficiently large thickness for withstanding mechanical stresses applied by expansion and shrinkage of an armored resin material, particularly in the vicinity of the anode-lead formation position, whilst the remaining portion of the electrically conductive polymer layer has a sufficiently thin thickness for reducing an equivalent series resistance.

The above novel solid electrolytic capacitor having the improved conductive polymer film may be formed as follows.

A valve action metal foil is etched to form a valve action metal anode. Alternatively, a valve action metal is sintered to form a sintered valve action metal anode. For example, if the valve action metal is aluminum, an aluminum foil is etched and then a large number of pores are formed on a surface of the valve action metal. If the valve action metal is tantalum or niobium, then powered tantalum or niobium is pressed and sintered to form the sintered anode. Normally, the anode is cylindrically or rectangular parallelepiped shaped.

The valve action metal anode is subjected to an anodic oxidation to form a dielectric oxide film on a surface of the valve action metal anode. If the valve action metal is tantalum, then a tantalum pentoxide dielectric film is formed.

A conductive polymer layer as a solid electrolyte in the form of a part of a cathode may be formed as follows. The anode coated with the dielectric layer is dipped into an oxidizing agent solution including an oxidizing agent and having a first specific gravity. Subsequently, the anode coated with the dielectric layer which still remains wetted with a thin film of the oxidizing agent solution is dipped into a second solution including monomers of an electrically conductive polymer. The monomer solution is insoluble with the oxidizing agent solution. The monomer solution further has a second specific gravity which is larger than the first specific gravity of the oxidizing agent solution. The anode is dipped in such a direction that the anode-lead formation position is positioned upwardly, so that the thin film of the oxidizing agent solution is partially floated by a difference in specific gravity between the oxidizing agent solution and the monomer solution so as to move a part of the oxidizing agent solution upwardly, thereby to thickly coat an upper portion of the dielectric layer. As a result, a polymerization reaction of the monomers is predominantly caused on the upper portion of the dielectric layer, thereby to form an electrically conductive polymer layer having a thicker portion than a remaining portion thereof, wherein the thicker portion extends on the upper portion of the dielectric layer. The boundary between the thicker portion and the remaining portion is not step-shaped but is slope-shaped. The boundary forms a sloped-boundary loop which extends to be parallel to a flat plane vertical to a direction that the anode-lead formation position is positioned upwardly, whereby the thicker portion continuously extends closer to the anode-lead formation position than the remaining portion. The second specific gravity may be larger than the first specific gravity by not less than 0.1 and the monomer solution may have a solubility of not more than 0.3 g of the monomers to 1000 cc of water. The oxidizing agent solution may comprise a ferric toluenesulfonate solution and the monomer solution may comprise a 3,4-ethylene-dioxythiophene solution. Alternatively, the oxidizing agent solution may comprise a ferric benzenesulfonate solution and the monomer solution may comprise a 3,4-ethylene-dioxythiophene solution.

Alternatively, the following method of forming the conductive polymer film is also available. The anode coated with the dielectric layer is dipped into an oxidizing agent solution including an oxidizing agent and having a first specific gravity. A surface of the dielectric layer coating the anode is dried to form a dried thin film of the oxidizing agent which coats the surface of the dielectric layer. Further, the anode coated with the dielectric layer coated with the dried thin film of the oxidizing agent is dipped into a pure water to form a wet thin film containing the oxidizing agent. Subsequently, the anode coated with the dielectric layer coated with the wet thin film is dipped into a monomer solution including monomers of an electrically conductive polymer. The monomer solution is insoluble with the oxidizing agent solution and further has a second specific gravity larger than the first specific gravity of the oxidizing agent solution. The anode is dipped in such a direction that the anode-lead formation position is positioned upwardly, so that the wet thin film is partially floated by a difference in specific gravity between the oxidizing agent solution and the monomer solution so as to move a part of the oxidizing agent solution upwardly, thereby to thickly coat an upper portion of the dielectric layer. As a result, a polymerization reaction of the monomers is predominantly caused on the upper portion of the dielectric layer, thereby to form an electrically conductive polymer layer having a thicker portion than a remaining portion thereof, wherein the thicker portion extends on the upper portion of the dielectric layer. The boundary between the thicker portion and the remaining portion is not step-shaped but is slope-shaped. The boundary forms a sloped-boundary loop which extends to be parallel to a flat plane vertical to a direction that the anode-lead formation position is positioned upwardly, whereby the thicker portion continuously extends closer to the anode-lead formation position than the remaining portion. The second specific gravity may be larger than the first specific gravity by not less than 0.1 and the monomer solution may have a solubility of not more than 0.3 g of the monomers to 1000 cc of water. The oxidizing agent solution may comprise a ferric toluenesulfonate solution and the monomer solution may comprise a 3,4-ethylene-dioxythiophene solution. Alternatively, the oxidizing agent solution may comprise a ferric benzenesulfonate solution and the monomer solution may comprise a 3,4-ethylene-dioxythiophene solution.

A carbon paste is applied on a surface of the conductive polymer layer and then a silver paste is further applied on the applied carbon paste for subsequent sintering the same to form laminations of the carbon and silver layers which coat the conductive polymer layer.

An external anode lead is connected to the anode lead which projects from the anode through the dielectric film outwardly. Further, a cathode lead is formed on the silver layer of the cathode. Finally, the above capacitor is sealed with a resin.

FIG. 1 is a cross sectional elevation view illustrative of a novel solid electrolytic capacitor having an improved conductive polymer layer in accordance with the present invention.

The novel solid electrolytic capacitor has a tantalum-sintered pellet 2 as a valve action metal anode, a tantalum oxide film 3 as a dielectric layer which coats the tantalum-sintered pellet 2, and a cathode.

The tantalum-sintered pellet 2 as the valve action metal anode is cylindrically or rectangular parallelepiped shaped. The cathode comprises a conductive polymer layer 4 which coats the tantalum oxide film 3, a carbon paste layer 5 which coats the conductive polymer layer 4, and a silver paste layer 6 which coats the carbon paste layer 5. A cathode lead 9 is bonded through an electrically conductive adhesive 8 to the silver paste layer 6 of the cathode. An anode lead 1 is also provided which projects from the tantalum-sintered pellet 2 as the valve action metal through the tantalum oxide film 3. The conductive polymer layer 4 of the cathode is electrically isolated or separated by the tantalum oxide film 3 as the dielectric layer from the tantalum-sintered pellet 2 as the valve action metal anode and the anode lead 1. An external anode lead 7 is further provided which is connected with the anode lead 1. An epoxy resin 10 is provided which seals the solid electrolytic capacitor, provided the cathode lead 9 and the external anode lead 7 project through the epoxy resin 10.

Figure 2:
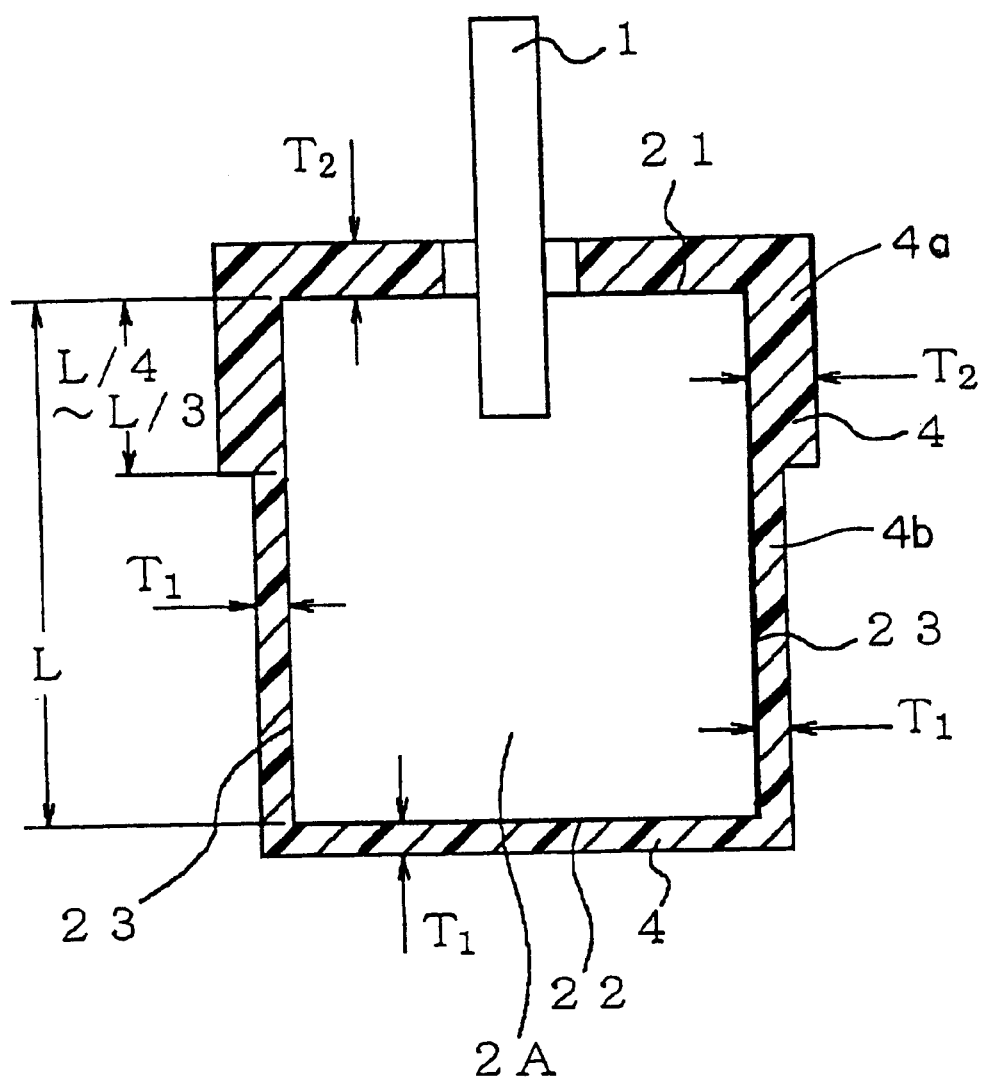
FIG. 2 is a cross sectional elevation view illustrative of an improved electrically conductive polymer layer coating a dielectric film coating an anode in a novel solid electrolytic capacitor of FIG. 1.

FIG. 2 is a cross sectional elevation view illustrative of an improved electrically conductive polymer layer coating a dielectric film coating an anode in a novel solid electrolytic capacitor of FIG. 1. The tantalum-sintered pellet 2 as the valve action metal anode is cylindrically or rectangular parallelepiped shaped. A sintered pellet 2A comprises the tantalum-sintered pellet 2 and the tantalum oxide film 3 as the dielectric layer. The sintered pellet 2A is also cylindrically or rectangular parallele-piped shaped which has first and second faces 21 and 22 which are opposite to each other and a side face 23. The anode lead 1 projects from the first face of the sintered pellet 2A. The electrically conductive polymer layer 4 has a thicker portion 4a than a remaining portion 4b. The thicker portion 4a extends both on the first face 21 and on a part of the side face 23 in the vicinity of the first face 21 so that the thicker portion 4a extends in the vicinity of the anode lead 1. The thicker portion 4a of the electrically conductive polymer layer 4 is bounded with the remaining portion 4b so that a sloped-boundary loop between the thicker portion 4a and the remaining portion 4b extends to be parallel to a flat plane which is perpendicular to a direction along which the anode lead 1 projects through the tantalum oxide film 3, whereby the thicker portion 4a continuously extends closer to the anode lead 1 than the remaining portion 4b. The thicker portion 4a also has a second thickness T2 which is thicker by 1–40 micrometers than a first thickness T1 of the remaining portion 4b, wherein the first thickness T1 is 0.05–10 micrometers. The thicker portion 4a extends in a range of one quarter L/4 to one third L/3 of a length L defined between the first and second faces of the sintered pellet 2A. The above conditions for the first and second thickness T1 and T2 as well as the existent region of the thicker portion 4a are optimum both to withstand mechanical stresses applied by expansion and shrinkage of an armored resin material, particularly in the vicinity of the projecting anode lead 1, and to reduce an equivalent series resistance of the solid electrolytic capacitor. It is further preferable that the second thickness T2 is thicker by 1–20 micrometers than the first thickness T1.

The electrically conductive polymer layer 4 is made of a conductive polymer doped with an electron donor or an electron acceptor so that the conductive polymer layer 4 has a high electrical conductivity, a capability of exhibiting a transition into an insulator upon a heat generation by a short circuit current due to defects of a dielectric film for suppressing the short circuit current, and a high thermal stability at a temperature of, for example, at least 240° C. The conductive polymer layer 4 is doped with an electron donor or an electron acceptor to have a high conductivity of not less than about 1 S/m. The conductivity may be controlled by selecting substances of the oxidizing agent and monomers and controlling polymerization reaction conditions.

PREFERRED EXAMPLES

Example 1

A tantalum sintered pellet 2 as a valve action metal anode was prepared which has rectangular parallelepiped shape of 1 mm__~1 mm__~1 mm. The tantalum sintered pellet 2 has a void ratio of about 60%. The tantalum sintered pellet 2 has an anode lead 1. The tantalum sintered pellet 2 was then subjected to an anodic oxidation in a 0.05%-phosphorus solution with a voltage application at 20V, thereby to form a tantalum oxide film 3 as a dielectric layer which coats an entire surface of the tantalum sintered pellet 2 as the valve action metal anode. As a result, a sintered pellet 2A was formed which comprises the tantalum sintered pellet 2 as the valve action metal anode and the tantalum oxide film 3 as the dielectric layer.

The sintered pellet 2A was then dipped in an oxidizing agent solution including 10–50% of ferric benzenesulfonate as an oxidizing agent for a few minutes. Subsequently, the sintered pellet 2A which still remains wetted with a thin film of the oxidizing agent solution was dipped into a monomer solution including 3,4-ethylene-dioxythiophene for 5 minutes. The monomer solution is insoluble with the oxidizing agent solution. The monomer solution further has a larger specific gravity than the oxidizing agent solution. The specific gravity of the ferric toluenesulfonate solution as the oxidizing agent solution is smaller by 0.33 than the specific gravity of the 3,4-ethylene-dioxythiophene solution as the monomer solution. The 3,4-ethylene-dioxythiophene solution as the monomer solution has a solubility of 0.2 g of 3,4-ethylene-dioxythiophene to 1000 cc of water. The sintered pellet 2A was dipped in such a direction that the anode lead 1 is positioned upwardly, so that the thin film of the oxidizing agent solution is partially floated by the above difference in specific gravity between the oxidizing agent solution and the monomer solution so as to move a part of the oxidizing agent solution upwardly, thereby to thickly coat an upper portion of the dielectric layer. The sintered pellet 2A was naturally dried for promoting an intended polymerization reaction, wherein the polymerization reaction of the monomers was predominantly caused on the upper portion of the sintered pellet 2A, thereby to form a polythiophene layer 4 as an electrically conductive layer. The polythiophene layer 4 has a thicker portion 4A than a remaining portion 4B thereof. The thicker portion 4*a* extends both on the first face 21 and on a part of the side face 23 in the vicinity of the first face 21 so that the thicker portion 4*a* extends in the vicinity of the anode lead 1. The thicker portion 4*a* is bounded with the remaining portion 4*b* so that a sloped-boundary loop between the thicker portion 4*a* and the remaining portion 4*b* extends to be parallel to a flat plane which is vertical to a direction along which the anode lead 1 projects through the tantalum oxide film 3, whereby the thicker portion 4*a* continuously extends in a closer side to the anode lead 1 than the remaining portion 4*b*.

The sintered pellet 2A coated with the polythiophene polymer layer 4 was then cleaned with an organic solvent for 10 minutes.

The above process is repeated plural times before a carbon paste 5 is applied on the polythiophene polymer layer 4 and subsequently a silver paste 6 is applied on the carbon paste 5 prior to a sintering process to form laminations of the carbon paste layer 5 and the silver paste layer 6. An external anode lead 7 is welded with the anode lead 1. A cathode lead 9 is also welded with the silver paste layer 6. An epoxy resin 10 is provided which seals the solid electrolytic capacitor, provided the cathode lead 9 and the external anode lead 7 project through the epoxy resin 10. As a result, the solid electrolytic capacitor was completed.

It was confirmed that if the difference in specific gravity between the oxidizing agent solution and the monomer solution is not less than 1.0 and further if the oxidizing agent solution and the monomer solution are insoluble with each other namely the solubility of the monomer to 1000 cc of water is not more than 3.0 g, then the use of the ferric toluenesulfonate solution as the oxidizing agent solution in combination with other monomer solutions causes the same results as described above.

It was also confirmed that if the thicker portion 4*a* has a second thickness T2 which is thicker by 1–40 micrometers than a first thickness T1 of the remaining portion 4*b* and the first thickness T1 is 0.05–10 micrometers, and further if the thicker portion 4*a* extends in a range of one quarter L/4 to one third L/3 of a length L defined between the first and second faces of the sintered pellet 2A, then those conditions are optimum both to withstand mechanical stresses applied by expansion and shrinkage of an armored resin material, particularly in the vicinity of the projecting anode lead 1, and to reduce an equivalent series resistance of the solid electrolytic capacitor.

Example 2

A tantalum sintered pellet 2 as a valve action metal anode was prepared which has rectangular parallelepiped shape of 1 mm_~1 mm_~1 mm. The tantalum sintered pellet 2 has a void ratio of about 60%. The tantalum sintered pellet 2 has an anode lead 1. The tantalum sintered pellet 2 was then subjected to an anodic oxidation in a 0.05%-phosphorus solution with a voltage application at 20V, thereby to form a tantalum oxide film 3 as a dielectric layer which coats an entire surface of the tantalum sintered pellet 2 as the valve action metal anode. As a result, a sintered pellet 2A was formed which comprises the tantalum sintered pellet 2 as the valve action metal anode and the tantalum oxide film 3 as the dielectric layer.

The sintered pellet 2A was then dipped in an oxidizing agent solution including 10–50% of ferric benzenesulfonate as an oxidizing agent for a few minutes. Thereafter, the sintered pellet 2A was naturally dried at room temperature for 60 minutes to allow immersion of ferric benzenesulfonate as the oxidizing agent into porous surfaces of the sintered pellet 2A, in order to reduce an equivalent series resistance. The sintered pellet 2A was then dipped into a pure water for 5 minutes to wet the dried oxidizing agent film coating the sintered pellet 2A to place the surface in substantially the same condition as the oxidizing agent solution. Subsequently, the sintered pellet 2A which still remains wetted with the water was dipped into a monomer solution including 3,4-ethylene-dioxythiophene for 5 minutes. The monomer solution is insoluble with the oxidizing agent solution. The monomer solution further has a larger specific gravity than the oxidizing agent solution. The specific gravity of the ferric toluenesulfonate solution as the oxidizing agent solution is smaller by 0.33 than the specific gravity of the 3,4-ethylene-dioxythiophene solution as the monomer solution. The 3,4-ethylene-dioxythiophene solution as the monomer solution has a solubility of 0.2 g of 3,4-ethylene-dioxythiophene to 1000 cc of water. The sintered pellet 2A was dipped in such a direction that the anode lead 1 is positioned upwardly, so that the thin film of the oxidizing agent solution is partially floated by the above difference in specific gravity between the oxidizing agent solution and the monomer solution so as to move a part of the oxidizing agent solution upwardly, thereby to thickly coat an upper portion of the dielectric layer. The sintered pellet 2A was naturally dried for promoting an intended polymerization reaction, wherein the polymerization reaction of the monomers was predominantly caused on the upper portion of the sintered pellet 2A, thereby to form a polythiophene layer 4 as an electrically conductive layer. The polythiophene layer 4 has a thicker portion 4A than a remaining portion 4B thereof. The thicker portion 4*a* extends both on the first face 21 and on a part of the side face 23 in the vicinity of the first face 21 so that the thicker portion 4a extends in the vicinity of the anode lead 1. The thicker portion 4*a* is bounded with the remaining portion 4*b* so that a sloped-boundary loop between the thicker portion 4*a* and the remaining portion 4*b* extends to be parallel to a flat plane which is vertical to a direction along which the anode lead 1 projects through the tantalum oxide film 3, whereby the thicker portion 4*a* continuously extends in a closer side to the anode lead 1 than the remaining portion 4*b*.

The sintered pellet 2A coated with the polythiophene polymer layer 4 was then cleaned with an organic solvent for 10 minutes.

The above process is repeated plural times before a carbon paste 5 is applied on the polythiophene polymer layer 4 and subsequently a silver paste 6 is applied on the carbon paste 5 prior to a sintering process to form laminations of the carbon paste layer 5 and the silver paste layer 6. An external anode lead 7 is welded with the anode lead 1. A cathode lead 9 is also welded with the silver paste layer 6. An epoxy resin 10 is provided which seals the solid electrolytic capacitor, provided the cathode lead 9 and the external anode lead 7 project through the epoxy resin 10. As a result, the solid electrolytic capacitor was completed.

It was confirmed that if the difference in specific gravity between the oxidizing agent solution and the monomer solution is not less than 1.0 and further if the oxidizing agent solution and the monomer solution are insoluble with each other namely the solubility of the monomer to 1000 cc of water is not more than 3.0 g, then the use of the ferric toluenesulfonate solution as the oxidizing agent solution in combination with other monomer solutions causes the same results as described above.

It was also confirmed that if the thicker portion 4a has a second thickness T2 which is thicker by 1–40 micrometers than a first thickness T1 of the remaining portion 4b and the first thickness T1 is 0.05–10 micrometers, and further if the thicker portion 4a extends in a range of one quarter L/4 to one third L/3 of a length L defined between the first and second faces of the sintered pellet 2A, then those conditions are optimum both to withstand mechanical stresses applied by expansion and shrinkage of an armored resin material, particularly in the vicinity of the projecting anode lead 1, and to reduce an equivalent series resistance of the solid electrolytic capacitor.

Evaluation Test

Evaluation tests were made on an influence of a difference in thickness of the thicker portion 4A from the remaining portion 4B of the conductive polymer layer 4 by measurements to the equivalent series resistance, a rate of leakage current appearance after the external anode lead has been welded to the anode lead 1, and a process capability index which indicates variation of leakage currents appeared after the external anode lead has been welded to the anode lead 1.

TABLE 1

| Difference | less than 1 ƒÊm | 1–20 ƒÊm | 20–40 ƒÊm | more than 40 ƒÊm |
|---|---|---|---|---|
| ESR | 50 mƒ¶ | 55 mƒ¶ | 56 mƒ¶ | 80 mƒ¶ |
| RLC | 12.5% | 0.050% | 0.030% | 0.029% |
| PCLC | 0.1 | 1.45 | 0.99 | 0.95 | where "Difference" is the difference in thickness of the thicker portion 4A from the remaining portion 4B of the conductive polymer layer 4, "ESC" is the equivalent series resistance, "RLC" is the rate of leakage current appearance after the external anode lead has been welded to the anode lead 1, and "PCLC" is the process capability index which indicates variation of leakage currents appeared after the external anode lead has been welded to the anode lead 1. A possible low equivalent series resistance is preferable. A possible low rate of leakage current appearance is preferable. A possible high process capability index which indicates variation of leakage currents appeared is preferable, wherein if the process capability is high, then this means variation in thickness is small and if the process capability is low, then this means variation in thickness is large.

If the difference in thickness of the thicker portion 4A from the remaining portion 4B is less than 1 micrometer, then the equivalent series resistance of the solid electrolytic capacitor is low but the rate of leakage current appearance is high due to dielectric defect caused in the vicinity of the anode lead 1 by an externally applied mechanical stress from the sealing resin.

If the difference in thickness of the thicker portion 4A from the remaining portion 4B is 1–40 micrometers, then the equivalent series resistance of the solid electrolytic capacitor is still low and also the rate of leakage current appearance is low because the thicker portion 4A serves as a buffer or a damper the externally applied mechanical stress from the sealing resin.

If the difference in thickness of the thicker portion 4A from the remaining portion 4B is more than 40 micrometers, then the equivalent series resistance of the solid electrolytic capacitor is high even the rate of leakage current appearance is low.

In view of the process capability, it is preferable that the difference in thickness of the thicker portion 4A from the remaining portion 4B is more than 1 micrometer, and it is more preferable that the difference in thickness is 1–20 micrometers.

The thickness T1 of the remaining portion 4B of the conductive polymer layer 4 may be decided in consideration of both a possible reduction in the equivalent series resistance and a possible rising of the withstand voltage. For example, in order to avoid the extensive increase in the equivalent series resistance, the thickness T1 of the remaining portion 4B of the conductive polymer layer 4 is not more than 10 micrometers, whilst in view of keeping the necessary withstand voltage, the thickness T1 may be not less than 0.05 micrometers.

Comparative Example

A tantalum sintered pellet as a valve action metal anode was prepared which has rectangular parallelepiped shape of 1 mm__~1 mm__~1 mm. The tantalum sintered pellet has a void ratio of about 60%. The tantalum sintered pellet has an anode lead. The tantalum sintered pellet was then subjected to an anodic oxidation in a 0.05%-phosphorus solution with a voltage application at 20V, thereby to form a tantalum oxide film as a dielectric layer which coats an entire surface of the tantalum sintered pellet as the valve action metal anode. As a result, a sintered pellet was formed which comprises the tantalum sintered pellet as the valve action metal anode and the tantalum oxide film as the dielectric layer.

The sintered pellet was then dipped in an oxidizing agent solution including 10–50% of ferric benzenesulfonate as an oxidizing agent for a few minutes. Thereafter, the sintered pellet was naturally dried at room temperature for 10 minutes. Without dipping the sintered pellet into a pure water, the sintered pellet was dipped into a monomer solution including 3,4-ethylene-dioxythiophene for 5 minutes. The sintered pellet was dipped in such a direction that the anode lead 1 is positioned upwardly. The dried thin film of the oxidizing agent is not moved upwardly, thereby to almost uniformly coat he entire surface of the dielectric layer. The sintered pellet was naturally dried for promoting an intended polymerization reaction, wherein the polymerization reaction of the monomers was almost uniformly caused on the entire surface of the sintered pellet, thereby to form a uniform thickness polythiophene layer as an electrically conductive layer.

The sintered pellet 2A coated with the polythiophene polymer layer 4 was then cleaned with an organic solvent for 10 minutes.

The above process is repeated ten times before a carbon paste 5 is applied on the polythiophene polymer layer 4 and subsequently a silver paste 6 is applied on the carbon paste 5 prior to a sintering process to form laminations of the carbon paste layer 5 and the silver paste layer 6. An external anode lead 7 is welded with the anode lead 1. A cathode lead 9 is also welded with the silver paste layer 6. An epoxy resin 10 is provided which seals the solid electrolytic capacitor, provided the cathode lead 9 and the external anode lead 7 project through the epoxy resin 10. As a result, the solid electrolytic capacitor was completed.

TABLE 2

|  | T2(fÊm)/T1(fÊm) | ESR | RLC |
| --- | --- | --- | --- |
| Example 1 | 27.1/7.22 | 55 mfΩ | 0.015% |
| Example 2 | 32.3/8.15 | 56 mfΩ | 1.011% |
| Com. Example | 5.00/5.27 | 54 mfΩ | 12.5% | where "ESC" is the equivalent series resistance measured at 100 kHz, and "RLC" is the rate of leakage current appearance after the external anode lead has been welded to the anode lead 1. A possible low equivalent series resistance is preferable. A possible low rate of leakage current appearance is preferable.

The solid electrolytic capacitor in the comparative example has a rate of leakage current appearance which is much higher than those of the novel solid electrolytic capacitor in the first and second examples in accordance with the present invention. This means that the novel solid electrolytic capacitor in the first and second examples in accordance with the present invention is much superior in thermal stability than the solid electrolytic capacitor in the comparative example.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An electrically conductive polymer layer of a solid electrolytic capacitor, said electrically conductive polymer layer coating a dielectric layer coating an anode with an anode lead which projects outwardly from said anode through said dielectric layer, and said electrically conductive polymer layer being separated by said dielectric layer from said anode lead, wherein said electrically conductive polymer layer has a thicker portion than a remaining portion thereof and said thicker portion extends at least in the vicinity of said anode lead, and said thicker portion is bounded with said remaining portion so that a sloped-boundary loop between said thicker portion and said remaining portion extends to be parallel to a flat plane perpendicular to a direction along which said anode lead projects through said dielectric layer, whereby said thicker portion continuously extends closer to said anode lead than said remaining portion, and wherein said thicker portion has a first thickness which is thicker by 1–40 micrometers than a second thickness of said remaining portion and said second thickness is 0.05–10 micrometers.

2. The electrically conductive polymer layer as claimed in claim 1, wherein said thicker portion extends in a range of one quarter to one third of an existent region of inside faces of said electrically conductive polymer layer in said direction along which said anode lead projects through said dielectric layer.

3. The electrically conductive polymer layer as claimed in claim 1, wherein said first thickness is thicker by 1–20 micrometers than said second thickness.

4. A solid electrolytic capacitor comprising:

an anode made of a valve action metal;

a dielectric layer coating said anode;

an anode lead projecting from said anode through said dielectric layer;

a cathode having an electrically conductive polymer layer which coats said dielectric layer; and a cathode lead projecting from said cathode, whereby said cathode is electrically separated by said dielectric layer from both said anode and said anode lead, wherein said electrically conductive polymer layer has a thicker portion than a remaining portion thereof and said thicker portion extends at least in the vicinity of said anode lead, and said thicker portion is bounded with said remaining portion so that a sloped-boundary loop between said thicker portion and said remaining portion extends to be parallel to a flat plane perpendicular to a direction along which said anode lead projects through said dielectric layer, whereby said thicker portion continuously extends closer to said anode lead than said remaining portion, and wherein said thicker portion has a first thickness which is thicker by 1–40 micrometers than a second thickness of said remaining portion and said second thickness is 0.05–10 micrometers.

5. The solid electrolytic capacitor as claimed in claim 4, wherein said first thickness is thicker by 1–20 micrometers than said second thickness.

6. A solid electrolytic capacitor comprising:

an anode made of a valve action metal;

a dielectric layer coating said anode;

an anode lead projecting from said anode through said dielectric layer;

a cathode having an electrically conductive polymer layer which coats said dielectric layer, whereby said cathode is electrically separated by said dielectric layer from both said anode and said anode lead; and a cathode lead projecting from said cathode, wherein said electrically conductive polymer layer has a thicker portion than a remaining portion thereof and said thicker portion extends at least in the vicinity of said anode lead, and said thicker portion is bounded with said remaining portion so that a sloped-boundary loop between said thicker portion and said remaining portion extends to be parallel to a flat plane perpendicular to a direction along which said anode lead projects through said dielectric layer, whereby said thicker portion continuously extends closer to said anode lead than said remaining portion.

7. The solid electrolytic capacitor as claimed in claim 6, wherein said thicker portion extends in a range of one quarter to one third of an existent region of inside faces of said electrically conductive polymer layer in said direction along which said anode lead projects through said dielectric layer.

8. The electrically conductive polymer layer as claimed in claim 7, wherein said thicker portion has a first thickness which is thicker by 1–40 micrometers than a second thickness of said remaining portion and said second thickness is 0.05–10 micrometers.

9. The electrically conductive polymer layer as claimed in claim 8, wherein said first thickness is thicker by 1–20 micrometers than said second thickness.

10. An electrically conductive polymer layer of a solid electrolytic capacitor, said electrically conductive polymer layer coating a dielectric layer coating an anode with an anode lead which projects outwardly from said anode through said dielectric layer, and said electrically conductive polymer layer being separated by said dielectric layer from said anode and said anode lead, wherein said electrically conductive polymer layer has a continuous neck portion adjacent to said anode lead that is thicker than a remaining portion thereof.

11. The electrically conductive polymer layer as claimed in claim 10, wherein said neck portion is bounded with said remaining portion so that a sloped-boundary loop between said neck portion and said remaining portion extends to be parallel to a flat plane, whereby said neck portion continuously extends closer to said anode lead than said remaining portion.

12. The electrically conductive polymer layer as claimed in claim 11, wherein said flat plane including said sloped-boundary loop between said neck portion and said remaining portion is perpendicular to a direction along which said anode lead projects through said dielectric layer.

13. The electrically conductive polymer layer as claimed in claim 12, wherein said neck portion extends in a range of one quarter to one third of an existent region of inside faces of said electrically conductive polymer layer in said direction along which said anode lead projects through said dielectric layer.

14. The electrically conductive polymer layer as claimed in claim 11, wherein said neck portion has a first thickness which is thicker by 1–40 micrometers than a second thickness of said remaining portion and said second thickness is 0.05–10 micrometers.

15. The electrically conductive polymer layer as claimed in claim 14, wherein said first thickness is thicker by 1–20 micrometers than said second thickness.

* * * * *